United States Patent [19]

McMurtry

[11] Patent Number: 5,048,194
[45] Date of Patent: Sep. 17, 1991

[54] POSITION SENSING PROBE

[75] Inventor: David R. McMurtry, Wotton-Under-Edge, United Kingdom

[73] Assignee: Renishaw plc, Gloucestershire, United Kingdom

[21] Appl. No.: 382,655
[22] PCT Filed: Dec. 5, 1988
[86] PCT No.: PCT/GB88/01069
§ 371 Date: Aug. 1, 1989
§ 102(e) Date: Aug. 1, 1989
[87] PCT Pub. No.: WO89/05435
PCT Pub. Date: Jun. 15, 1989

[30] Foreign Application Priority Data
Dec. 5, 1987 [GB] United Kingdom ............... 8728500

[51] Int. Cl.$^5$ ........................... G01B 5/20; G01B 7/28
[52] U.S. Cl. ........................................ 33/558; 33/561
[58] Field of Search ............... 33/556, 558, 559, 560, 33/561

[56] References Cited

U.S. PATENT DOCUMENTS

| 3,869,799 | 3/1975 | Neuer et al. ........................ 33/561 |
| 3,945,124 | 3/1976 | Jacoby et al. . |
| 4,084,323 | 4/1978 | McMurtry ........................ 33/503 |
| 4,153,998 | 5/1979 | McMurtry . |
| 4,177,568 | 12/1979 | Werner et al. . |
| 4,333,238 | 6/1982 | McMurtry . |
| 4,364,180 | 12/1982 | Willhelm ........................ 33/558 |
| 4,513,507 | 4/1985 | Laskowski . |
| 4,523,383 | 6/1985 | Rogers et al. . |
| 4,563,823 | 1/1986 | Klingler et al. ................ 33/558 |
| 4,621,434 | 11/1986 | Hirschmann ................... 33/558 |
| 4,716,656 | 1/1988 | Maddock et al. . |
| 4,752,166 | 6/1988 | Lehmkuhl . |
| 4,769,919 | 9/1988 | Lloyd et al. ..................... 33/558 |
| 4,882,848 | 11/1989 | Breyer et al. ................... 33/559 |

FOREIGN PATENT DOCUMENTS

| 0025724 | 3/1981 | European Pat. Off. . |
| 0239337 | 9/1987 | European Pat. Off. . |
| 1429973 | 3/1976 | United Kingdom . |
| 2006435 | 5/1979 | United Kingdom . |
| 1551218 | 8/1979 | United Kingdom . |
| 2037436 | 7/1980 | United Kingdom . |
| 2049198 | 12/1980 | United Kingdom ........... 33/561 |
| 8603829 | 7/1986 | World Int. Prop. O. . |
| 9004149 | 4/1990 | World Int. Prop. O. . |

Primary Examiner—Thomas B. Will
Attorney, Agent, or Firm—Oliff & Berridge

[57] ABSTRACT

A probe for use in co-ordinate measuring comprises three orthogonal spring parallelograms, each with a respective scale and read head, for measuring the location of a workpiece-contacting stylus. The probe also has a trigger sensor in the form of a piezoelectric crystal, which gives a trigger signal at the instant the stylus contacts the workpiece. This enables the scale readings to be taken at the instant of contact, in order to reduce dynamic errors.

10 Claims, 3 Drawing Sheets

POSITION SENSING PROBE

FIELD OF THE INVENTION

This invention relates to probes used for position sensing or measurement, in position determining apparatus such as co-ordinate measuring machines, machine tools and inspection robots.

DESCRIPTION OF PRIOR ART

It is known in such machines to mount a probe in a quill or spindle of the machine for movement in three dimensions, X,Y,Z. The machine has means for measuring the X,Y and Z co-ordinates of the probe, such as a scale and read head for each of these co-ordinate directions.

Two types of such probe are in common use. One is a trigger probe, which produces a trigger signal upon attaining a pre-determined relationship with a workpiece surface (such as contact of a stylus of the probe with the workpiece surface). This trigger signal is used to latch or freeze the output from the scales and read heads of the machine, and to cause a computer or numerical control which controls the operation of the machine to read the X,Y and Z co-ordinates relating to the position on the workpiece surface thus sensed. Examples of such probes can be seen in UK Patent Application GB 2,006,435 A (Renishaw), International Patent Application WO 86/03829 (Renishaw), and U.S. Pat. No. 4,177,568 (Zeiss).

The other known kind of probe is a measurement probe, producing an analogue or digital output proportional to displacement of a stylus of the probe in the X,Y and Z directions. Such a probe is particularly useful for scanning the contour of a workpiece surface, as opposed to measuring specific points on the workpiece surface to gauge the dimensions of the workpiece. Examples can be seen in U.S. Pat. No. 3,945,124 (Leitz), GB 1,429,973 (Zeiss), GB 1,551,218 (Rolls-Royce and Renishaw) and EP 0,239,337 (Renishaw).

SUMMARY OF THE INVENTION

In broad outline, one aspect of the present invention provides a combination of a trigger probe and a measurement probe.

In a second aspect of the invention, the present application describes novel forms of measurement probe, useable with or without combination with a trigger sensor.

In a third aspect, the invention relates to various novel methods of using a probe.

BRIEF DESCRIPTION OF THE DRAWINGS

Preferred embodiments of the invention will now be described with reference to the accompanying drawings, wherein.

DESCRIPTION OF PREFERRED EMBODIMENTS

Measurement Probe Arrangement

Figure 1:
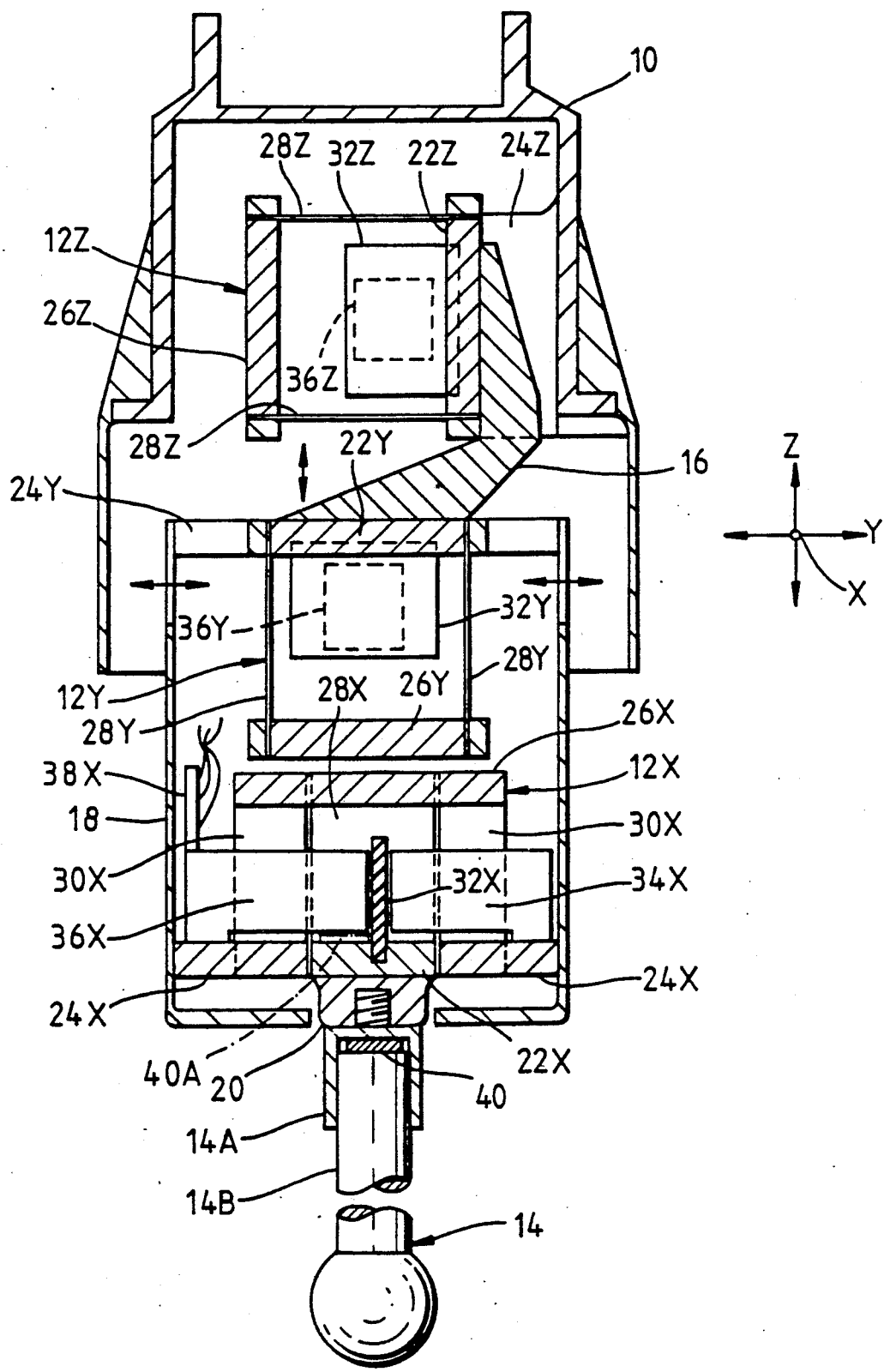
FIG. 1 is a vertical cross section of a probe.

Referring firstly to FIG. 1, the probe has an upper housing 10 which can be inserted in the quill or spindle of a co-ordinate measuring machine, inspection robot or machine tool, so as to be movable in three dimensions X,Y,Z. The probe comprises three spring parallelogram arrangements 12X, 12Y, 12Z arranged in series between the relatively fixed housing 10 and a movable workpiece-contacting stylus 14. Each of the spring parallelograms permits translational movement of the stylus 14 in a respective one of the directions X,Y,Z. Thus, the spring parallelogram 12Z allows for Z axis movement of a connecting member 16 arranged between the parallelograms 12Z and 12Y; the spring parallelogram 12Y provides for Y axis movement of a lower housing 18 relative to the connecting member 16; and the spring parallelogram 12X provides for X axis movement of a stylus holder 20 relative to the housing 18, the stylus 14 being secured in the stylus holder 20. The three spring parallelograms are substantially identical, except that they are of course orientated at 90° to each other, and the arrangement 12Y is inverted with respect to the arrangement 12X so that both fit inside the lower housing 18.

Figure 2:
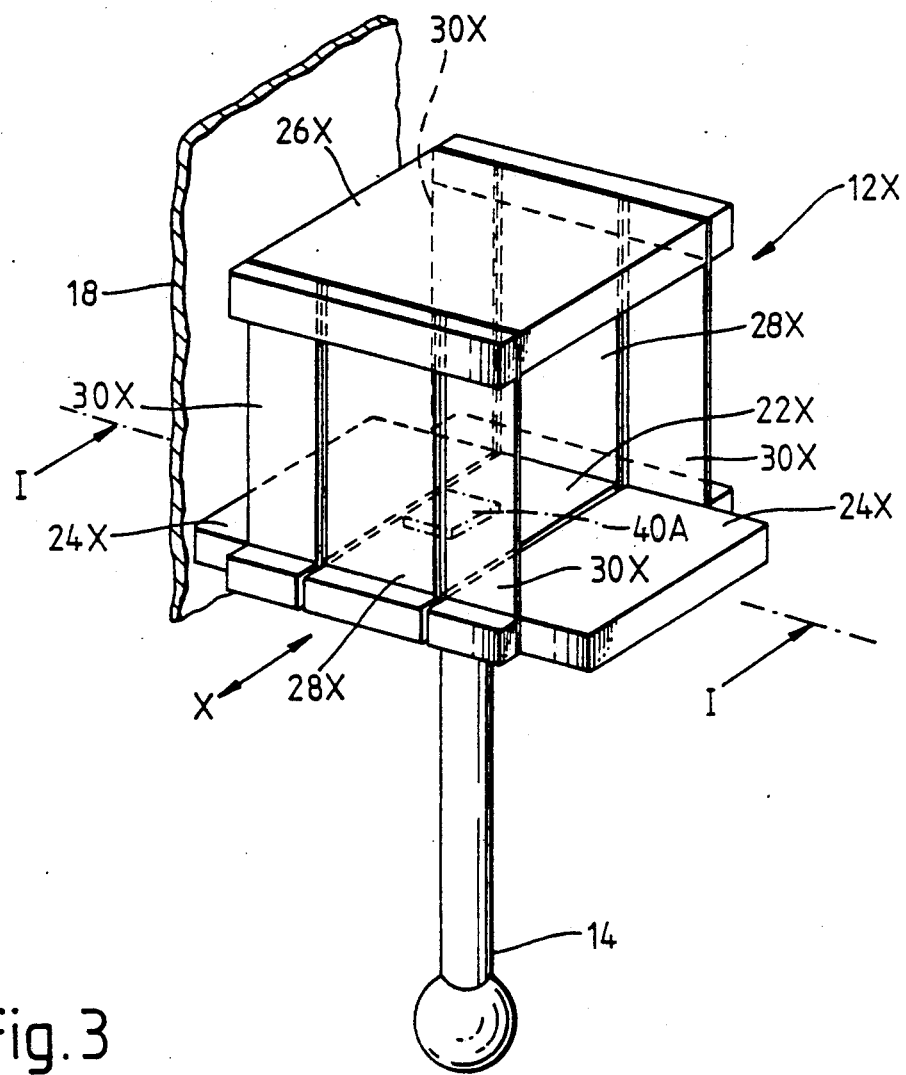
FIG. 2 is an isometric diagram of part of the probe.

The spring parallelogram arrangement 12X will be described with reference to both FIGS. 1 and 2. An inner plate 22X, which carries the stylus 14 via the stylus holder 20, is translatable in the X direction relative to a pair of outer plates 24X which are secured to the lower housing 18. The inner plate 22X is suspended from an intermediate plate 26X by a pair of parallel leaf springs 28X. In turn, the intermediate plate 26X is supported from the outer plates 24X by two pairs of parallel leaf springs 30X. Thus, the spring parallelogram arrangement 12X comprises two separate spring parallelograms, connected in series via the intermediate plate 26X in a doubled back manner. Whereas a single spring parallelogram would cause the movement of the stylus 14 to be arcuate relative to the lower housing 18, this doubled back arrangement allows for pure X axis translational movement of the stylus 14 relative to the housing 18.

This X axis translational movement can be measured in any conventional fashion. For example, a linear variable displacement transducer can be used for this purpose, as is well known. However, we prefer to use a transmissive optical scale 32X on the movable plate 22X (shown in FIG. 1 but not in FIG. 2). This is arranged between and traverses past a light source 34X (such as a light emitting diode) and a read head 36X, fixed to the respective fixed plates 24X. Suitable scales and read heads are known in the art, being commonly used as the scales and read heads for the X,Y and Z movements of the co-ordinate measuring machine or machine tool itself. The read head 36X is mounted via a circuit board 38X which provides signal conditioning of the read head output.

Apart from the differences of orientation noted above, the spring parallelogram arrangements 12Y and 12Z are similar to the arrangement 12X. In FIG. 1, corresponding parts have been given the same reference numbers, but with suffixes Y or Z instead of X. Further description is therefore unnecessary, save to note that the upper housing 10 is connected to the outer plates 24Z of the parallelogram 12Z; the connecting member 16 is connected between the inner plates 22Z, 22Y of the parallelograms 12Z and 12Y; and the lower housing 18 is connected to the outer plates 24Y of the parallelogram 12Y.

Trigger Sensor Arrangement

Figure 3:
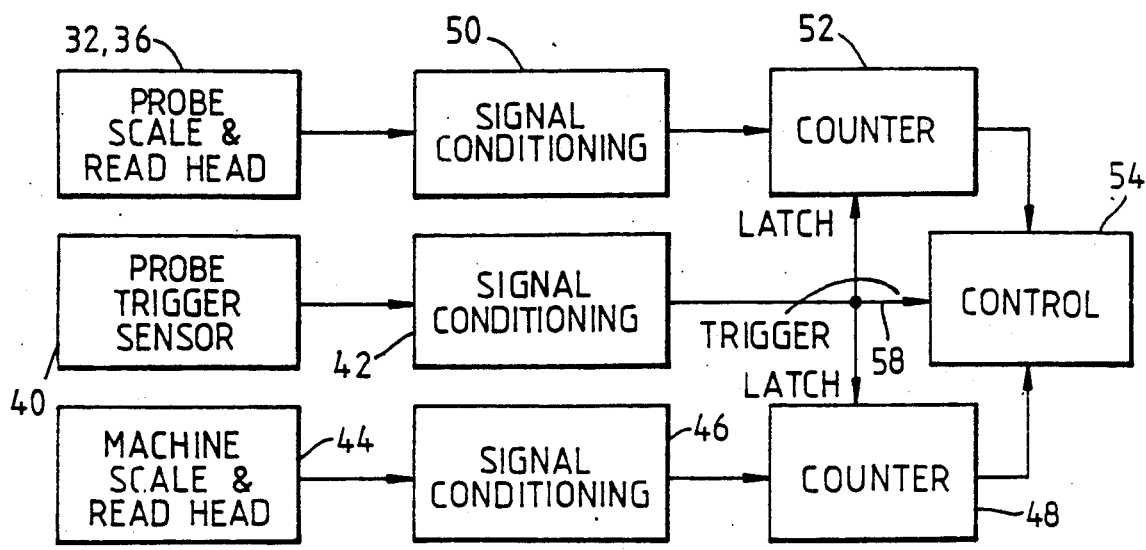
FIG. 3 is a block diagram showing how sensors in the probe are connected in a co-ordinate measuring machine or machine tool.

To provide for a trigger signal upon initial contact of the stylus 14 with a workpiece, a piezoelectric crystal 40 is sandwiched between two portions 14A, 14B of the stylus 14. Electrical connections (not shown) are made to each side of the piezoelectric crystal 40 and provide an electrical signal from the shock wave generated in the stylus 14 upon impact of the stylus with a workpiece. This signal is processed to provide a trigger signal by a signal conditioning circuit 42 (FIG. 3). Other mounting places for the piezoelectric crystal 40 are possible to achieve the same effect, provided it is mounted in a place where it can receive the shock wave and generate a signal therefrom. For example it may be mounted on top of the plate 22X as shown in chain-dotted lines at 40A in FIGS. and 2.

Alternative Probe Arrangements

Figure 4:
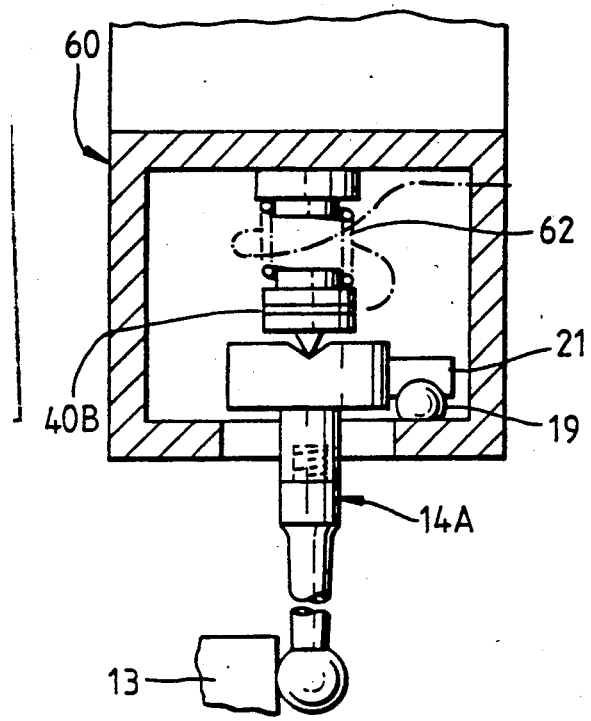
FIGS. 4 and 5 are vertical and horizontal sections of part of a modified probe.
Figure 5:
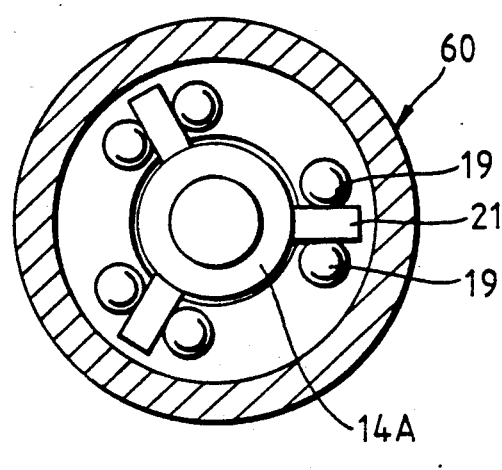

Rather than provide the piezoelectric crystal in the places described above, it is possible to substitute an entire trigger probe such as described in our International Patent Application No. WO 86/03829, fitted onto the stylus holder 20 in place of the stylus 14. That specification (which is incorporated herein by reference and to which the reader should refer for more details) describes a probe as shown in FIGS. 4 and 5 of the accompanying drawings. This produces a trigger signal from a piezoelectric crystal 40B and has an overtravel mechanism which enables its stylus 14A to be deflected from a rest position without damage upon contact with a workpiece 13. The overtravel mechanism comprises a kinematic seating arrangement of balls 19 and rollers 21 for the stylus 14A and the stylus is biassed into the rest position by a compression spring 62. A housing 60 is secured to the stylus holder 20 of FIG. 1.

This combination probe acts as follows upon contact with a workpiece. First, the contact is detected by the piezo 40B. The spring 62 is pre-loaded so that after this, as the probe continues to be driven into the workpiece, the spring parallelograms 12X, 12Y, 12Z are deflected, giving analogue outputs from their read heads 36X, 36Y, 36Z. The kinematic balls and rollers remain seated during this, because of the pre-load. Eventually, if the movement is not stopped, the force on the stylus 14A overcomes the pre-load, and the balls and rollers become unseated. The spring rate of the spring 62 is arranged to be much less than that of the spring parallelograms 12, so that the stylus 14A can be further deflected ("overtravel") without damage to the spring parallelograms. As described in WO86/03829, the unseating of the balls and rollers can be used to provide a switching signal to give fail-safe stopping of the machine movement in this event.

Other kinematic seating arrangements can be used if desired in place of the balls and rollers 19, 21. Some suitable arrangements are described in U.S. Pat. No. 4,153,998 (also incorporated herein by reference).

Figure 6:
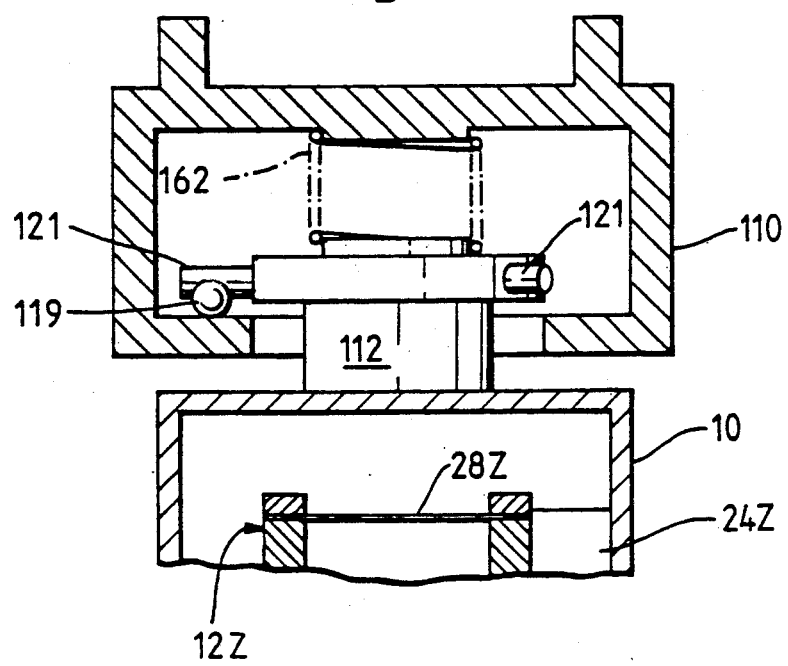
FIG. 6 is a vertical section of part of a further modified probe.

It will be understood that instead of providing this overtravel arrangement between the stylus holder 20 and the stylus 14, a similar spring-biassed kinematic seat could be used to mount the upper housing 10 of the probe of FIG. 1 in the quill or spindle of the machine. This is illustrated in FIG. 6, where the housing 10 of the probe of FIG.1 is mounted on a member 112 in a second housing 110 which is attached to the quill of the machine. In the housing 110 is a kinematic seating arrangement comprising balls 119 on the housing 110 and rollers 121 on the member 112, as previously. A spring 162 biasses the member 112 into the rest position, and has a spring rate and pre-load as before.

Methods of Use

It is possible to use the probes described above in the same manner as a conventional analogue or measurement probe, e.g. for scanning the contour of a workpiece. For this purpose, the signal processing circuit for the trigger sensor would be switched off. Alternatively, the trigger sensor may simply be omitted.

However, the probe as described above can also be used in a novel manner as follows.

FIG. 3 shows the trigger sensor 40 and its signal conditioning circuit 42, together with a computer numerical control 54 for the co-ordinate measuring machine or machine tool. As is conventional, the control 54 runs a program for driving the machine in X,Y and Z directions to touch a workpiece with the stylus 14 of the probe at various points to be measured. Also shown in FIG. 3 are the machine's scale and read head 44 which measure the movement along one of the machine's axes of the quill or spindle holding the probe. While the probe is being moved, the scale and read head 44 are continually producing an output via signal conditioning circuitry 46 to a counter 48, which keeps a count representing in digital form the absolute position of the probe along the machine's axis. At the same time, it is to be expected that the probe stylus 14 will move relative to the quill or spindle of the machine, because of deflections of the spring parallelograms caused by inertia of the various probe components as they are accelerated, and because of induced vibrations of the spring parallelograms. The position of the stylus 14, relative to the housing 10 of the probe along the given axis, is indicated by a counter 52, similar to the counter 48, which receives the output from the probe scale 32 and read head 36 via signal conditioning circuitry 50. It will be understood that the scales and read heads 44,32,36, the circuits 46,50 and the counters 48,52 are repeated for each of the axes X,Y,Z.

The trigger signal from the signal conditioning circuit 42, when received, is used to latch the two counters 48,52 to freeze their outputs. This produces an instantaneous snap shot of the relative positions of the probe on the machine and of the stylus on the probe at the instant of contact. Upon receipt of this trigger signal, on a line 58, the control 54 is programmed to stop the probe movement, and to add together the frozen outputs of the counters 48,52, giving a combined result representing the absolute position of the point of contact on the workpiece surface in the given axis. Taken together with the corresponding circuits for the other two axes, this gives the three-dimensional co-ordinates of the contact point.

This arrangement means that the present probe has considerable advantage over known analogue or measurement probes when used for contact sensing. A conventional such analogue probe would need to be driven into the workpiece surface and brought to a halt and allowed to settle before taking a reading; or at the very least, it would need to be driven very slowly into the workpiece surface. This is because otherwise the inertia of the various components of the probe causes distortion of the spring parallelograms and even of the stylus itself as the probe drives further into the workpiece, which would cause dynamic inaccuracies of the readings in the various axes. Because the probe has a different inertia in each axis, the inaccuracies would be different for each axis. However, with the present arrangement the sensor 40 produces the trigger signal instantly at the moment of initial contact. (It would be impossible to derive such an instant signal purely from the analogue outputs). This means that the readings are taken from the scales 32 and read heads 36 before any dynamic selection of the probe system has resulted from the workpiece contact. Only static deflections of the various probe axes need to be measured, and these are adequately indicated by the scales 32 and read heads 36.

The probe can thus be used to take accurate readings "on the fly" at a relatively high speed, without waiting for the probe to come to a halt and settle down. Because of this, a sequence of such readings such as would normally be necessary in order to inspect a workpiece can be completed much faster that would otherwise be the case. Furthermore, the user has the benefits of being able to take such fast readings with the same probe as he uses for scanning the contour of the surface of the workpiece, so that where both operations are to be performed it can be done without changing the probe over. This leads to a further increase in efficiency of use, as well as the cost benefit of only needing one probe.

A problem which can arise particularly with co-ordinate measuring machines (which generally have less massive structural components than machine tools) is that the quill and other structural components of the machine can suffer inertial deflections when accelerated. This is a source of potential inaccuracies quite separate from those due to the probe. U.S. Pat. No. 4,333,238 (McMurtry) suggests that an accelerometer can be mounted to move with the probe on the quill, to measure the accelerations. Corrections for the resulting deflections of the machine's structural components are thus obtained.

A further aspect of the present invention therefore involves the use of a spring parallelogram probe itself as such an accelerometer. The spring parallelograms will deflect from their null positions by an amount which depends on acceleration of the quill.

Taking the probe described above as an example of a suitable spring parallelogram probe, the control 54 is programmed to continually sample the output of the counter 52 for each axis, while the probe is being driven towards the workpiece. It keeps a record of the samples taken over a period of several cycles of the natural vibration frequency of the spring parallelogram for that axis, and the samples are taken at a rate faster than that natural frequency. As new samples are taken, they can overwrite the oldest samples previously recorded, provided there is always a record kept for the last few cycles. When a trigger signal 58 is received, the control calculates the mean of the recorded samples. This provides the mean deflection of the spring parallelogram for the axis concerned, independent of any vibration thereof, and therefore provides a measure of the deflection on the quill caused by acceleration. If suitable calibration of the deflection of the quill has been previously made, a correction for this quill deflection can now be added to the combined outputs of the counters 48,52. Desirably, however, the calculated mean is used as a simple-e "go/no-go" indication of the validity of the reading just taken: if the mean deflection of the parallelogram is sufficiently close to zero, it can be assumed that the quill was travelling at a constant velocity at the time of the workpiece contact, so that no inaccuracy has been caused by deflection of the quill or other structural components.

While the above description has been of probes which are deflectable in three axes X,Y,Z, it will be understood that the invention also has application in probes which are deflectable in only one or two axes. Furthermore, support means other than a spring parallelogram are possible. One possible support means is a series of rod-like links, as described in U.S. Pat. Nos. 4,523,383 or 4,716,656. Another possibility is to replace each spring parallelogram with a pair of parallel linear ball bearings, which each permit linear motion in a respective one of the orthogonal directions X,Y or Z. Such a support means is shown in co-pending International Publication No. WO 90/04149.

I claim:

1. A position sensing probe for use in position determining apparatus, comprising:
   a fixed part for mounting in the position determining apparatus, whereby the apparatus can move the probe relative to a workpiece surface;
   a movable part, having means for contacting the workpiece surface;
   support means for supporting the movable part on the fixed part so as to permit deflection of the movable part relative to the fixed part;
   means for measuring the amount of said deflection of the movable part relative to the fixed part, and providing an output in accordance therewith; and
   trigger means, independent of said deflection measuring means, for providing a trigger signal when said contacting means contacts the workpiece surface.

2. A probe according to claim 1, including means for freezing the output of the deflection measuring means upon receipt of the trigger signal.

3. A probe according to claim 1, wherein the trigger means is a piezoelectric crystal.

4. A probe according to claim 1, wherein the support means comprises at least one spring parallelogram.

5. A probe according to claim 4, wherein the support means comprises three spring parallelograms, arranged for deflection in respective orthogonal directions.

6. A probe according to claim 1, wherein the contacting means comprises a stylus.

7. A probe according to claim 6, including an over-travel mechanism located between the fixed part and the stylus, in series with the support means, the over-travel mechanism comprising:
   a seating arrangement having first seating elements connected to the fixed part, cooperating with second seating elements connected to the stylus, and
   bias means for urging the first and second seating elements into engagement with each other but permitting the seating elements to become disengaged upon application of sufficient force to the stylus.

8. A probe according to claim 7, wherein the seating arrangement is a kinematic seating arrangement.

9. A probe according to claim 7, wherein the over-travel mechanism is provided between the support means and the stylus, the first seating elements being connected to the fixed part via the support means.

10. A probe according to claim 7, wherein the over-travel mechanism is provided between the fixed part and the support means, the second seating elements being connected to the stylus via the support means.

* * * * *